United States Patent [19]
Isshiki et al.

[11] Patent Number: 5,217,820
[45] Date of Patent: Jun. 8, 1993

[54] HIGH DENSITY SLAVE MAGNETIC RECORDING MEDIA HAVING SPECIFIED PERPENDICULAR SQUARENESS RECTANGULAR RATIO, ROUGHNESS AND NUMBER OF PROJECTIONS

[75] Inventors: Masanori Isshiki; Toshiyuki Suzuki; Nobuyoshi Saito; Takeo Ito, all of Yokohama, Japan

[73] Assignee: Kabushiki Kaisha Toshiba, Kawasaki, Japan

[21] Appl. No.: 540,443

[22] Filed: Jun. 13, 1990

Related U.S. Application Data

[63] Continuation-in-part of Ser. No. 451,167, Dec. 15, 1989, abandoned.

[30] Foreign Application Priority Data

Dec. 16, 1988 [JP] Japan .................. 63-317820

[51] Int. Cl.$^5$ .................................................. G11B 5/00
[52] U.S. Cl. .................................. 428/694 B; 428/900; 360/16
[58] Field of Search ............... 428/694, 900; 369/84, 369/85; 360/15, 16, 17

[56] References Cited

U.S. PATENT DOCUMENTS

| | | | |
|---|---|---|---|
| 4,670,319 | 6/1987 | Katoh et al. | 428/141 |
| 4,997,696 | 3/1991 | Kamada et al. | 428/141 |
| 5,059,469 | 10/1991 | Hashimoto et al. | 428/141 |

FOREIGN PATENT DOCUMENTS

| | | |
|---|---|---|
| 208471 | 1/1987 | European Pat. Off. |
| 276127 | 7/1988 | European Pat. Off. |
| 375309 | 6/1990 | European Pat. Off. |
| 63-268124 | 11/1988 | Japan |

*Primary Examiner*—Paul J. Thibodeau
*Assistant Examiner*—Steven A. Resan
*Attorney, Agent, or Firm*—Foley & Lardner

[57] ABSTRACT

The high density slave magnetic recording media comprising on a non-magnetic substrate a magnetic recording layer coated with magnetic hexagonal ferrite powder along with a binder component to transfer the digital signals stored on the master magnetic recording media by the magnetic contact duplication process, is characterized in that the perpendicular squareness ratio of the magnetic recording layer is not less than 0.58 and is less than 0.7, center line average roughness Ra is not more than 0.01 μm, and the number of convex projections whose pitches are 10 to 90 μm and whose height is not less than 0.03 μm pp (bottom to top) is not more than 10 per 1 mm of running direction. The slave magnetic recording media permits the functionally enough duplication efficiency of digital signals by the magnetic contact duplication process and can considerably curb the error rate during the reproduction of the duplicated digital signals.

16 Claims, 4 Drawing Sheets

PERPENDICULAR SQUARENESS RATIO

HIGH DENSITY SLAVE MAGNETIC RECORDING MEDIA HAVING SPECIFIED PERPENDICULAR SQUARENESS RECTANGULAR RATIO, ROUGHNESS AND NUMBER OF PROJECTIONS

This application is a continuation-in-part of application Ser. No. 07/451,167 filed Dec. 15, 1989 now abandoned.

FIELD OF THE INVENTION AND RELATED ARTS STATEMENT

The present invention relates to magnetic recording media for slaves that stores digital recording signals, in particular digital audio signals duplicated via a magnetic contact duplication process.

As the procedure of producing prerecorded tapes and the like for DAT, a contact magnetic duplication process that, with a master magnetic recording tape and a high density slave magnetic recording tape caused to closely contact each other, duplicates magnetized patterns by applying e.g. a bias magnetic field to the contact section has been often utilized. It is possible in this way to duplicate magnetized patterns at high speed, in place of a direct recording duplication process that provides recording from the master tape recorder to a slave tape recorder at an equal speed ratio of 1:1.

The contact duplication process is such that a bias magnetic field is applied to the contact section of the master magnetic recording tape and a high density slave magnetic recording tape to duplicate signal magnetization of the master tape onto the high density slave magnetic recording tape.

A high density slave magnetic recording tape for use in the contact magnetic duplication process utilizing a bias magnetic field must have coercive force about ⅓ to ½ times as high as that of the master magnetic recording tape to avoid the demagnetization of the master magnetic recording tape by a bias magnetic field during contact duplication. For DAT providing high-density recording in a shortest wave length of 1 micrometer or less, recording characteristics in the short wave length region are important.

A typical perpendicular magnetic recording process, which involves a demagnetized field to be ignored in the magnetization transition region, is reportedly capable of high-density recording even with magnetic tapes which have relatively low coercive force Hc.

Perpendicular magnetic recording media, where a hexagonal ferrite powder crystal plate vertical with respect to the magnetization easy axis is arranged in parallel to the magnetic surface, has been spotlighted as the high density slave magnetic recording tape for the magnetic duplication process.

Only applying magnetic recording media based on typical hexagonal-system ferrite powder to a high density slave magnetic recording tape, however, provides no desired magnetic contact duplication efficiency.

To improve the duplication efficiency of magnetic recording media utilizing hexagonal-system ferrite powder, a method has been proposed (Japanese Patent Publication No. 268124/1988), which method is characterized by a perpendicular squareness ratio of 0.7 or more, perpendicular coercive force Hc of 800 Oe or less, and surface roughness Ra of the magnetic layer of 0.01 μm or less.

According to experiment by the inventors, the method permits high duplication reproduced output and provides good characteristics as high density slave magnetic recording media for analog signals, as shown in FIG. 4.

On the other hand, however, the experiment has revealed that, when duplicating a recording tape storing digital signals for DAT, a perpendicular squareness ratio that is too high results in a higher error rate during reproduction and, thus, in lower reliability as a DAT recording tape.

When preparing a duplicate tape for DAT by means of the magnetic contact duplication process, it is important to improve the reproduction of slave tape output by enhancing duplication efficiency, but it is also necessary to curb the error rate within the range allowing correction by correction codes.

The inventors, who had been engaged in investigation into solving such past difficulties, have found that the error rate of a duplicate tape for DAT can be reduced by curbing the perpendicular squareness ratio of high density slave magnetic recording media within the range from 0.58 (inclusive) to 0.7 (exclusive) and by decreasing the number of convex projections on the surface.

OBJECT AND SUMMARY OF THE INVENTION

An object of the present invention is to provide high density slave magnetic recording media that permit the functionally adequate duplication efficiency of digital signals by the magnetic contact duplication process and can considerably curb the error rate during the reproduction of the duplicated digital signals.

The other objects of the present invention will make to be clear through the following description.

The present invention provides high density slave magnetic recording media comprising, on a non-magnetic substrate, a magnetic recording layer coated with magnetic hexagonal-system ferrite powder along with a binder component to duplicate the digital signals stored on the master magnetic recording media by the magnetic contact duplication process, characterized in that the perpendicular squareness ratio of the magnetic recording layer is not less than 0.58 and is less than 0.7, preferably, not less than 0.59 and is not more than 0.68, mean center roughness Ra is not more than 0.01 μm, and the number of convex projections whose pitches are 10 to 90 μm and whose height is not less than 0.03 μm pp (bottom to top) is not more than 10 per 1 mm of running direction.

The above "perpendicular squareness ratio" has been subjected to demagnetization correction (4πM correction).

"Center line average roughness Ra" is based on a roughness indication method defined in JIS B 0601. When one charts surface roughness using a measuring device with a stylus tip radius of 2 μm, draws the center line providing the equal upper and lower areas over measuring length 1 more than three times as long as the cut-off value, and expresses the roughness curve as f(x) with the center line being the X axis, one gets:

$$Ra = 1/l \int l |f(x)| dx$$

The "convex projection whose pitch is 10 to 90 μm and whose height is not less than 0.03 μm pp" corresponds to a projection to be measured during the measurement of "ten-point mean roughness Rz" defined in JIS B0601. "Ten-point mean roughness Rz" refers to the mean height value from the bottom to the top of five projections higher than the other ones within a certain standard length range, and corresponds to the height of "convex projections whose pitches are 10 to 90 μm and whose height is not less than 0.03 μm pp".

For the high density slave magnetic recording media of the present invention, the perpendicular squareness ratio is restricted within the range from 0.58 (inclusive) to 0.7 (exclusive), because, as shown in FIG. 1, a perpendicular squareness ratio of less than 0.58 or 0.7 or more leads to a considerable increase in error rates of read digital signals during reproduction.

Typically, magnetic recording media storing digital data, e.g., DAT require certain reproduced output spectrum characteristics (FIG. 2, curve A) corresponding to the frequency at which a metal tape is recorded by the head under constant current, a shown in FIG. 2. Thus, if the perpendicular squareness ratio of high density slave magnetic recording media is not less than 0.7, the duplication efficiency in magnetic contact duplication for a short wave length region becomes better, but frequency characteristics for reproduced output are shifted toward the short wave length region, (as shown in FIG. 2, curve B). The spectrum characteristics of reproduced output depend on the perpendicular squareness ratio. Spectrum characteristics of reproduced output shifted toward the short wave length region cause the reproduced output level in the long wave length region to be decreased. Although DAT uses an equalizer to equalize overall frequency characteristics during reproduction to avoid interference between codes, a decrease in output in the long wave length region makes it impossible to get enough waveform equalization effects, resulting in increased error rates during reading digital signals. An increase in the perpendicular squareness ratio over 0.7 leads to an increase in error rates.

If the perpendicular squareness ratio is less than 0.58, the duplication efficiency during magnetic contact duplication in the short wave length region becomes insufficient and spectrum characteristics of reproduced output are shifted toward the long wave length region (FIG. 2, curve C), resulting in an increase in error rates during reading digital signals.

For high density slave magnetic recording media, the duplication efficiency during magnetic contact duplication can be made to be enough and the error rate during reproduction can be curbed by adjusting the perpendicular squareness ratio within the range from 0.58 (inclusive) to 0.7 (exclusive).

For high density slave magnetic recording media of the present invention, the surface roughness of the magnetic recording layer has been defined as above, because center line average roughness over 0.01 μm increases the overall spacing with the master magnetic recording media and thus the loss of duplication, and more than 10 convex projections having a height of over 0.03 μm pp per mm of running direction over several 10 μm further increases the loss and, thus, the duplication efficiency is lowered and error rates grow during reading digital signals during in a reproduction process. FIG. 3 shows the relation the logarithm of the error rate to the mean number of convex projections having height over 0.03 μm pp in perpendicular high density slave magnetic recording media with almost the same magnetic characteristics (Hc=640±10Oe, Ms=135±5 emu/cc and SQR=0.66±0.01).

Magnetic hexagonal ferrite powder used in the present invention includes uniaxial hexagonal Ba ferrite, Sr ferrite, Pb ferrite and Ca ferrite where the M (Magnetoplumbite) type or W type, easy axis is vertical with respect to the particle platelet surface, and ferrite whose part of Ba is replaced by other Sr, Pb or Ca, and ion substitution products expressed by the following general formula:

M1O.n(Fe$_{1-m}$M2$_m$)$_2$O$_3$ (where M1 stands for at least one of Ba, Sr, Ca and Pb; M2 for at least one of Ti, Co, In, Mn, Ti, Sn, Ge, V, Nb, Sb, Ta, Cr, Mo, W and the like; n for a value of 5.4 to 6.0; and m for a number of 0 to 0.2;)

As shown in the above general formula, the replacement of part of Fe as a constituent of hexagonal ferrite by various kinds of metal permits coercive force to be reduced.

The coercive force of hexagonal ferrite to be used is preferably 400 Oe to 800 Oe, the mean particle diameter is preferably 0.03 to 0.08 μm, and the particle diameter to thickness ratio is preferably 3 to 5. Meeting the requirements of the coercive force, mean particle diameter and particle diameter to thickness ratio of magnetic hexagonal ferrite powder, and the ratio of binder components described later to magnetic powder permits the perpendicular squareness ratio to be held at a certain value.

The binder components for use in the present invention include polyacryl resin, polyvinyl chrolide resin, polyvinyl acetate resin, polystyrene resin, polyurethane resin, polyester resin, polycarbonate resin, epoxy resin, melamine resin, polyamide resin, polybutadiene resin, polyacrylonitrile resin, phenol resin, polybutyral resin, phenoxy resin, urea resin and furan resin, and their copolymeric resins. To these resins, resin containing sulfone groups, phosphate groups, carboxyl groups or resin containing alkali metal salt or alkali earth metal salt groups thereof, or resin containing hydrophilic groups such as amino groups, alkylamino groups, ammonium groups, alkylammonium groups or hydroxyl groups may added to improve the dispersibility of magnetic hexagonal-system ferrite powder.

To these binder components, polyisocyanate is added as a hardener to enhance the mechanical strength of magnetic hexagonal-system ferrite coatings applied on the substrate.

The mixture ratio of the magnetic hexagonal-system ferrite powder and the binder component is preferably 100 weight parts (magnetic hexagonal ferrite powder) and 20 weight parts or less, in particular 8 to 16 weight parts (binder component).

Into the magnetic recording layer of high density slave magnetic recording media provided by the present invention, an appropriate amount of additive such as lubricant, dispersant, abradant, or carbon black may be incorporated.

The candidate lubricant includes fatty acid, fatty acid ester and silicone, ana the candidate dispersant includes anion surface active agent, cation surface active agent, non-ion surface active agent and the like. The preferable abradant includes TiO$_2$, Cr$_2$O$_3$, Al$_2$O$_3$, SiC, and ZrO$_2$ each of which has Moh's hardness of 5 or more.

The process of producing the high density slave magnetic recording media provided by the present invention consists of fully mixing above mentioned magnetic hexagonal ferrite powder, binder components, and above additives along with solvent; adding hardener such as polyisocyanate if needed to prepare the magnetic hexagonal ferrite powder and the binder components so that the ratio of both is 100:8 to 16 (solid weight ratio); applying the magnetic paint onto a non-magnetic substrate composed of polyester or polyolefin so that a layer with a thickness of preferably 1 to 5 μm (after drying), more preferably 2 to 4 μm (after drying) may be obtained; and subjecting the magnetic coating to orientation processing in a vertical magnetic field of 2 to 7 kOe, followed by drying and smoothing treatment by a calender.

Drying conditions including the temperature of a drying zone and web speed, and pressure, temperature and web speed in the calender process also affect the surface characteristics of the magnetic recording layer. But their optimum conditions depend on the types of solvent and binder components, concentration, and the thickness of a magnetic recording layer. Hence, the optimum conditions for drying should have been determined by experiment.

The high density slave magnetic recording media provided by the present invention offers output characteristics adapted to the reproduction of digital signals e.g. for DAT, permits the error rate during reproduction to be lowered, and provides high duplication efficiency by means of magnetic contact duplication.

DETAILED DESCRIPTION OF PREFERRED EMBODIMENTS

Figure 1:
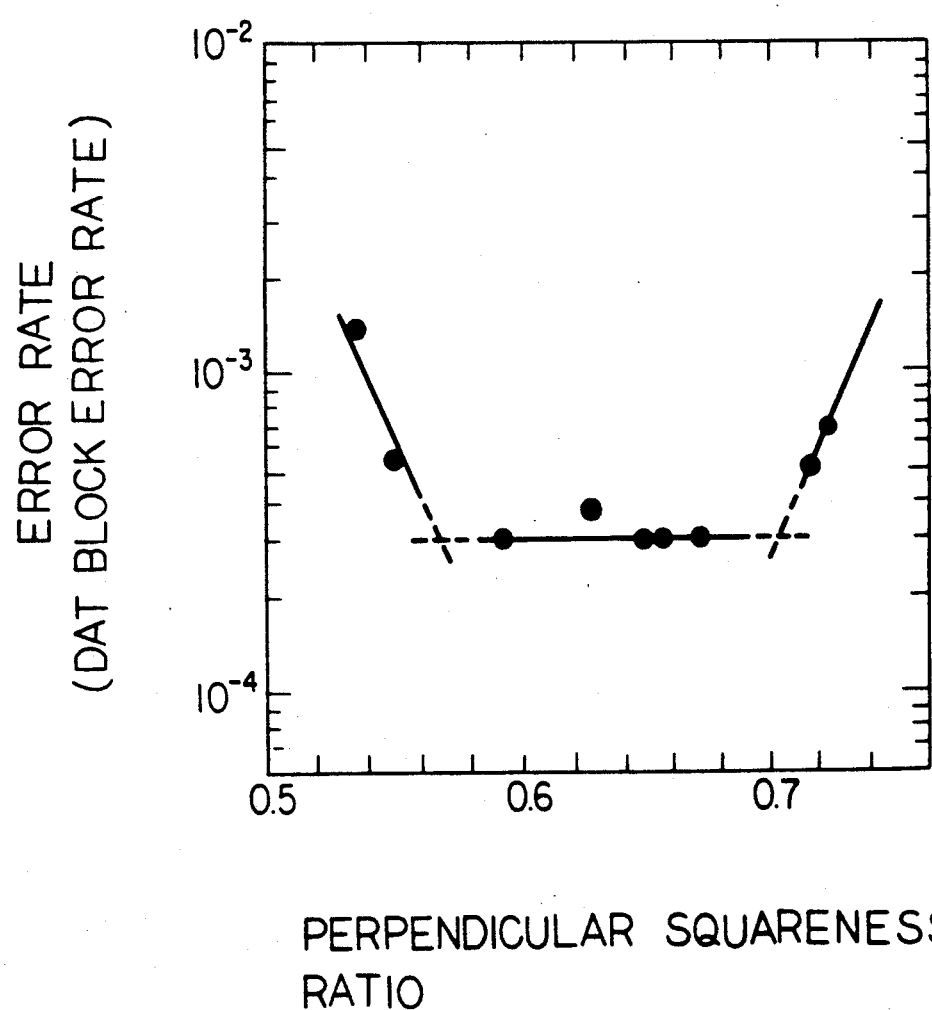
FIG. 1 provides an illustration showing the relation between the perpendicular squareness ration of high density slave magnetic recording media and the error rate.
Figure 2:
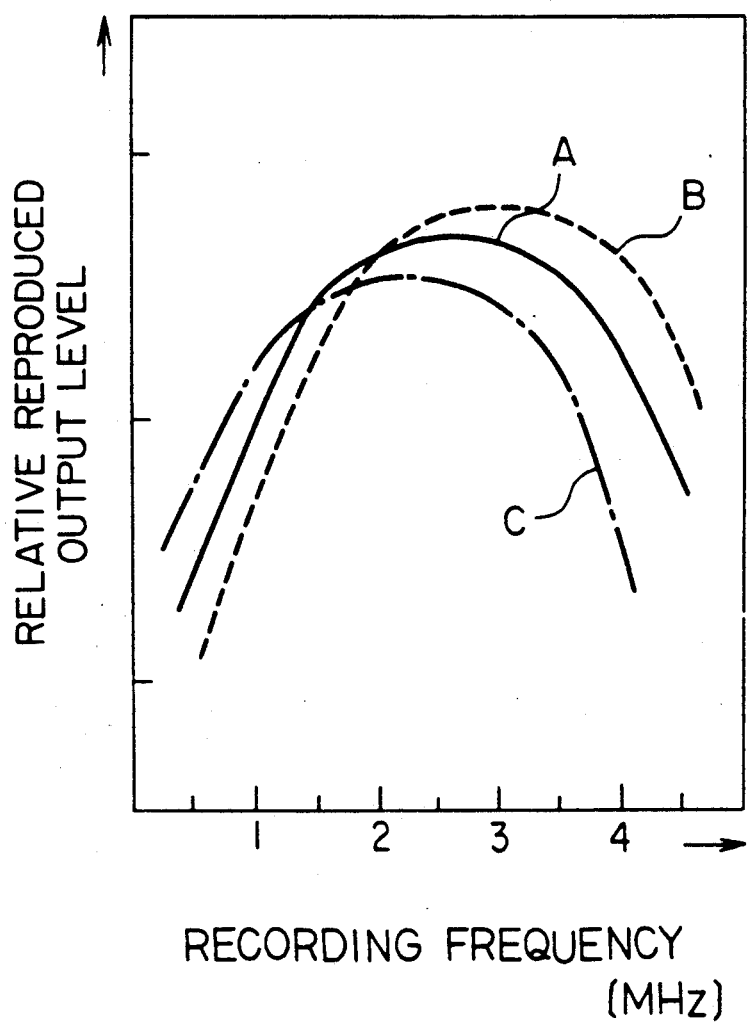
FIG. 2 provides a schematic illustration showing the relation between the perpendicular squareness ratio and reproduced output spectrum characteristics in DAT.
Figure 3:
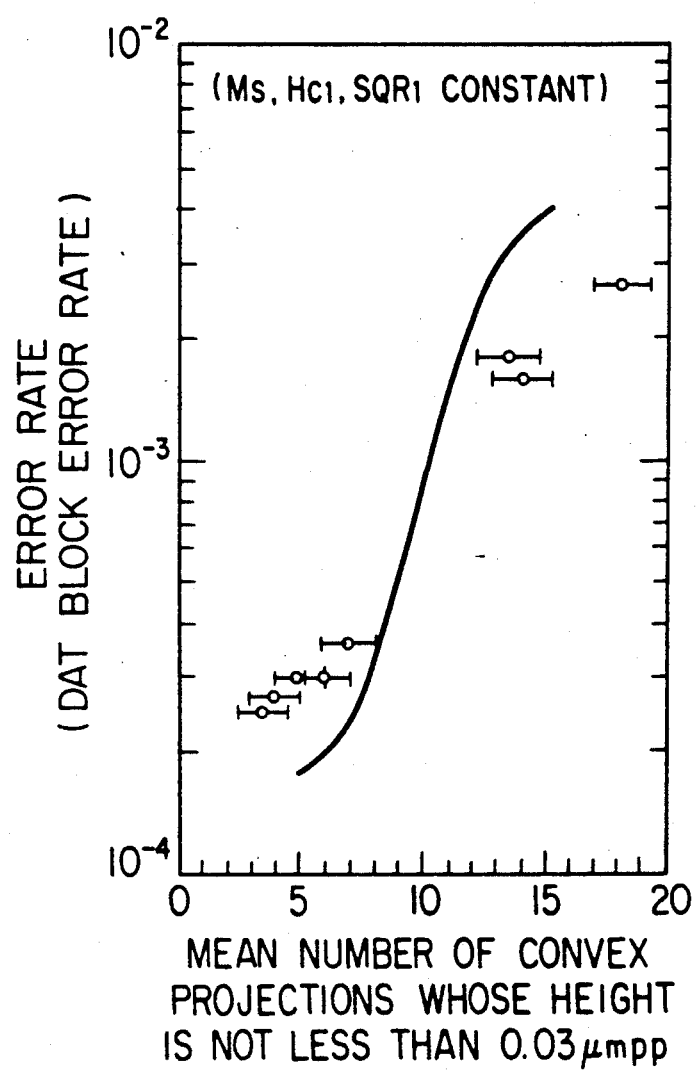
FIG. 3 provides an illustration showing the relation between the error rate and the mean number of convex projections whose height is not less than 0.03 μm pp per mm of running direction of slave magnetic recording media.
Figure 4:
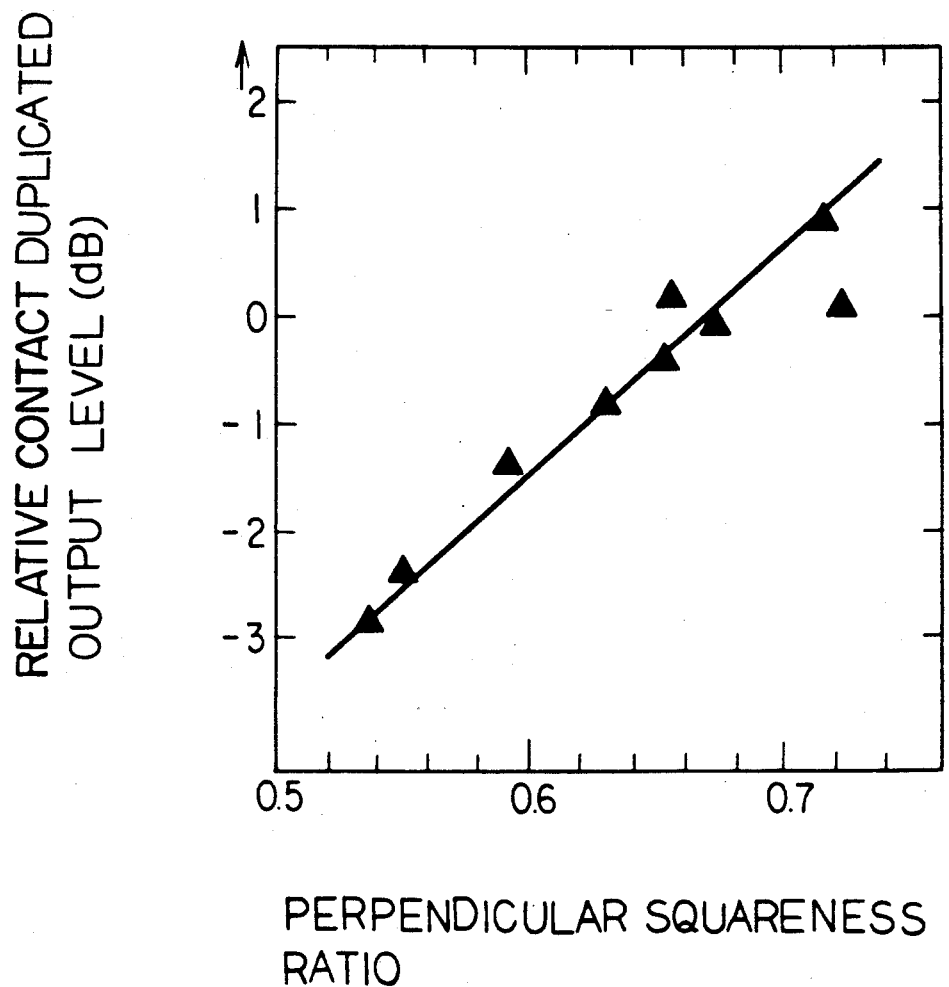
FIG. 4 provides an illustration showing the relation between the perpendicular squareness ratio of high density slave magnetic recording media and duplication efficiency.

Given below is a description of preferred embodiments.

EXAMPLE 1

| | |
|---|---|
| Ba ferrite powder | 100 weight parts |
| (coercive force: 630 Oe, | |
| mean particle diameter: 0.05 μm, | |
| particle diameter to thickness ratio: 3.5) | |
| Polyurethane resin | 6 weight parts |
| Polyvinyl chrolide-vinyl acetate copolymer | 8 weight parts |
| Alumina (mean particle diameter: 0.3 μm) | 3 weight parts |
| Stearic acid | 2 weight parts |
| Methyl ethyl ketone/toluene/cyclohexaon (mixture ratio: 1:1:1) | 180 weight parts |

The above materials were mixed and then dispersed with a sand grinder for 2 hours. To the obtained magnetic paint, 3 weight parts of hardener, Colonate L (product name manufactured by Nihon Polyurethane, Inc.), were added. Then, this magnetic paint was applied onto a polyethylene terephthalate film with a thickness of 10 μm using a reverse coater. Next, this coating was subjected to vertical orientation in a magnetic field of 6 kOe, dried at a temperature of 85° C. at a web speed of 80 m/minute, subjected to calender treatment with a pressurizing roll of 70 degrees ° C. under a line pressure of 200 kg/cm, and cured at a temperature of 40° C. for 8 days, followed by slitting to prepare a high density slave magnetic recording tape for DAT with a width of 3.81 mm having a magnetic recording tape with a thickness of 3 μm.

EXAMPLES 2 TO 7

Six slave magnetic recording tapes were prepared under the same conditions as example 1, except that Ba ferrite powder having slightly different mean particle diameters, and particle diameter to thickness ratios, was used in place of Ba ferrite powder for example 1.

| Example No. | 1 | 2 | 3 | 4 | 5 | 6 | 7 |
|---|---|---|---|---|---|---|---|
| Mean particle diameter (μm) | 0.05 | 0.04 | 0.03 | 0.04 | 0.04 | 0.08 | 0.03 |
| Particle diameter to thickness ratio | 3.5 | 3.8 | 3.0 | 3.5 | 3.0 | 3.5 | 5.0 |

COMPARATIVE EXAMPLES 1 TO 4

Four (4) high density slave magnetic recording tapes were prepared under the same conditions as example 1, except that the strength of the magnetic field during orientation in the examples was replaced by that of 10 kOe (comparable examples 1 and 2) and that of zero (comparable examples 3 and 4).

COMPARABLE EXAMPLES 5 TO 7

Two (2) high density slave magnetic recording tapes with different surface roughness aspects were prepared under nearly the same conditions as example 1, except that drying conditions (temperature drying zone and web speed) were changed.

| Comparable example No. | 5 | 6 | 7 |
|---|---|---|---|
| Drying temperature (degrees °C.) | 70 | 85 | 95 |
| Web speed (m/min.) | 100 | 120 | 140 |

The so-obtained slave magnetic recording tapes of the examples and the comparable examples were measured for their coercive force, perpendicular squareness ratios, and surface roughness (and the mean number of convex projections with a height of 0.03 μm pp or more per mm of running direction). Further, the efficiency of magnetic contact duplication, and the error rate (block error rate) at the time when recording signals for DAT duplicated by magnetic contact duplication were reproduced were measured. The following Table shows results of this measurement.

The mean number of convex projections with a height of 0.03 μm pp or more per mm of running direction over several tens of μm was determined by measuring tape surface roughness by way of a three-dimensional surface roughness gauge (a stylus whose tip has a radius of 2 μm) and averaging the number of projections at 20 positions.

The duplication efficiency of the magnetic contact duplication was determined as follows:

Rectangular waves with a frequency of 4.7 MHz were recorded as mirror patterns using a DAT mirror master machine (relative speed: 3.133 m/sec.) for a metal tape having a coercive force of 2,000 Oe to prepare the master tape; the master tape was brought to come in close contact with a slave magnetic recording tape by an air pressure method; and a bias magnetic field was applied so that the output of duplication might become the highest, to transfer the magnetic signal field. Using the so obtained slave tape, the output of the duplicated tape with a DAT deck by means of a spectrum analyzer.

The DAT block error rate for the reproduced signals was measured using an error checker.

|  | PERPENDICULAR SQUARENESS RATIO | COERCIVE FORCE (Oe) | R a ($\mu$m) | NUMBER OF CONVEX PROJECTIONS (Number/mm) | DUPLICATED OUTPUT (dB) | ERROR RATE (BLOCK ERROR RATE) |
| --- | --- | --- | --- | --- | --- | --- |
| EXAMPLE |  |  |  |  |  |  |
| 1 | 0.67 | 630 | 0.006 | 5 | 0 | $3.1 \times 10^{-4}$ |
| 2 | 0.68 | 680 | 0.006 | 5 | +0.2 | $3.0 \times 10^{-4}$ |
| 3 | 0.59 | 620 | 0.007 | 6 | −1.4 | $3.2 \times 10^{-4}$ |
| 4 | 0.66 | 635 | 0.005 | 5 | +0.2 | $3.0 \times 10^{-4}$ |
| 5 | 0.63 | 655 | 0.007 | 7 | −0.8 | $3.7 \times 10^{-4}$ |
| 6 | 0.65 | 645 | 0.005 | 5 | −0.4 | $3.0 \times 10^{-4}$ |
| 7 | 0.65 | 650 | 0.005 | 3 | −0.5 | $2.4 \times 10^{-4}$ |
| COMPARATIVE EXAMPLE |  |  |  |  |  |  |
| 1 | 0.72 | 655 | 0.007 | 7 | +0.2 | $6.6 \times 10^{-4}$ |
| 2 | 0.71 | 640 | 0.007 | 5 | +0.9 | $5.1 \times 10^{-4}$ |
| 3 | 0.55 | 630 | 0.005 | 5 | −2.4 | $5.5 \times 10^{-4}$ |
| 4 | 0.54 | 620 | 0.005 | 5 | −3.0 | $10.5 \times 10^{-4}$ |
| 5 | 0.67 | 630 | 0.007 | 18 | +0.2 | $11.6 \times 10^{-4}$ |
| 6 | 0.66 | 640 | 0.007 | 13 | 0 | $10.8 \times 10^{-4}$ |
| 7 | 0.66 | 645 | 0.015 | 10 | −0.2 | $33.2 \times 10^{-4}$ |

What is claimed is:

1. High density slave magnetic recording media comprising a non-magnetic substrate coated with a magnetic recording layer comprising magnetic hexagonal ferrite powder along with binder components to duplicate digital signals stored in the master magnetic recording media by a magnetic contact duplication process, characterized in that:
   the perpendicular squareness rectangular ratio of said magnetic recording layer is not less than 0.58 and is less than 0.7;
   center line average roughness Ra is not more than 0.01 $\mu$m; and
   the number of convex projections having a pitch of 10 to 90 $\mu$m and a height of 0.03 $\mu$m pp or more is not more than 10 per mm of running direction.

2. High density slave magnetic recording media as set forth in claim 1, characterized in that said magnetic hexagonal ferrite powder is expressed by the general formula, $M1O \cdot n(Fe_{1-m}M2_m)_2O_3$, where M1 stands for at least one of Ba, Sr, Ca and Pb; M2 for at least one of Ti, Co, Zn, In, Mn, Ti, Sn, Ge, V, Nb, Sb, Ta, Cr, Mo, W and the like; n for a value of 5.4 to 6.0; and m for a number of 0 to 0.2;

3. High density slave magnetic recording media as set forth in claim 1, characterized in that said magnetic hexagonal-system ferrite powder has a mean particle diameter of 0.03 to 0.08 $\mu$m, a particle diameter to thickness ratio of 3 to 5, and coercive force of 400 Oe to 800 Oe.

4. High density slave magnetic recording media as set forth in claim 1, characterized in that the mixture weight ratio of said magnetic hexagonal ferrite powder and said binder component is 100:8 to 100:16.

5. High density slave magnetic recording media as set forth in claim 1, characterized in that said binder component consists of synthetic resin.

6. High density slave magnetic recording media as set forth in claim 5, characterized in that said binder component consists mainly of one or two synthetic resins selected from the group consisting of polyacryl resin, polyvinyl chloride resin, polyvinyl acetate resin, polystyrene resin, polyurethane resin, polyester resin, polycarbonate resin, epoxy resin, melamine resin, polyamide resin, polybutadiene resin, polyacrylonitrile resin, phenol resin, polybutyral resin, phenoxy resin, urea resin, furan resin, and their copolymers.

7. High density slave magnetic recording media as set forth in claim 2, characterized in that said magnetic hexagonal-system ferrite powder has a mean particle diameter of 0.03 to 0.08 $\mu$m, a particle diameter to thickness ratio of 3 to 5, and coercive forces of 400 Oe to 800 Oe.

8. High density slave magnetic recording media as set forth in claim 2, characterized in that the mixture weight ratio of said magnetic hexagonal ferrite powder and said binder component is 100:8 to 100:16.

9. High density slave magnetic recording media as set forth in claim 3, characterized in that the mixture weight ratio of said magnetic hexagonal ferrite powder and said binder component is 100:8 to 100:16.

10. High density slave magnetic recording media as set forth in claim 2, characterized in that said binder component consists of synthetic resin.

11. High density slave magnetic recording media as set forth in claim 3, characterized in that said binder component consists of synthetic resin.

12. High density slave magnetic recording media as set forth in claim 4, characterized in that said binder component consists of synthetic resin.

13. High density slave magnetic recording media as set forth in claim 10, characterized in that said binder component consists mainly of one or two synthetic resins selected from the group consisting of polyacryl resin, polyvinyl chloride resin, polyvinyl acetate resin, polystyrene resin, polyurethane resin, polyester resin, polycarbonate resin, epoxy resin, melamine resin, polyamide resin, polybutadiene resin, polyacrylonitrile resin, phenol resin, polybutyral resin, phenoxy resin, urea resin, furan resin, and their copolymers.

14. High density slave magnetic recording media as set forth in claim 11, characterized in that said binder component consists mainly of one or two synthetic resin selected from the group consisting of polyacryl resin, polyvinyl chloride resin, polyvinyl acetate resin, polystyrene resin, polyurethane resin, polyester resin, polycarbonate resin, epoxy resin, melamine resin, polyamide resin, polybutadiene resin, polyacrylonitrile resin, phenol resin, polybutyral resin, phenoxy resin, urea resin, furan resin, and their copolymers.

15. High density slave magnetic recording media as set forth in claim 12, characterized in that binder component consists mainly of one or two synthetic resin selected from the group consisting of polyacryl resin, polyvinyl chloride resin, polyvinyl acetate resin, polystyrene resin, polyurethane resin, polyester resin, polycarbonate resin, epoxy resin, melamine resin, polyamide resin, polybutadiene resin, polyacrylonitrile resin, phenol resin, polybutyral resin, phenoxy resin, urea resin, furan resin, and their copolymers.

16. High density slave magnetic recording media comprising a non-magnetic substrate coated with a magnetic recording layer comprising magnetic hexagonal ferrite powder along with binder components to duplicate digital signals stored in the master magnetic recording media by a magnetic contact duplication process, wherein:

the perpendicular squareness rectangular ratio of said magnetic recording layer is not less than 0.59 and not more than 0.68;

the center line average roundness Ra is not more than 0.01 $\mu m$; and the number of convex projections having a pitch of 10 to 90 $\mu m$ and a height of 0.03 $\mu m$ pp or more is not more than 10 per mm of running direction.

* * * * *

UNITED STATES PATENT AND TRADEMARK OFFICE
CERTIFICATE OF CORRECTION

PATENT NO. : 5,217,820

DATED : June 8, 1993

INVENTOR(S) : ISSHIKI et al.

It is certified that error appears in the above-identified patent and that said Letters Patent is hereby corrected as shown below:

Column 2, lines 61-63, delete "$Ra = 1/\ell \int |f(x)| dx$", and insert --$Ra = 1/\ell \int_0^\ell |f(x)| dx$--.

Column 4, line 56, delete "ana" and insert --and--.

Column 5, line 27, delete "ration" and insert --ratio--;
line 36, before "slave", insert --high density--.

Column 6, line 3, delete "degrees";
line 11, after "Six", insert --(6)--;
line 45, before "slave", insert --high density--.

UNITED STATES PATENT AND TRADEMARK OFFICE
CERTIFICATE OF CORRECTION

PATENT NO. : 5,217,820
DATED : June 8, 1993
INVENTOR(S) : ISSHIKI et al

It is certified that error appears in the above-identified patent and that said Letters Patent is hereby corrected as shown below:

Column 7, line 2, before "slave", insert --high density--;

line 6, delete "so obtained" and insert --so-obtained--.

Col. 8 Claim 14, line 3, delete "resin", and insert --resins--.
Col. 9 Claim 15, line 3, delete "resin", and insert --resins--.
Col. 10 Claim 16, line 11, delete "roundness" and insert --roughness--.

Signed and Sealed this

Seventh Day of February, 1995

Attest:

BRUCE LEHMAN

*Attesting Officer*    *Commissioner of Patents and Trademarks*